(12) United States Patent
Lagonik et al.

(10) Patent No.: US 8,049,658 B1
(45) Date of Patent: Nov. 1, 2011

(54) DETERMINATION OF THE THREE-DIMENSIONAL LOCATION OF A TARGET VIEWED BY A CAMERA

(75) Inventors: Louis Lagonik, Voorhees, NJ (US); Donna F. Smith, Hopewell, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1194 days.

(21) Appl. No.: 11/807,309

(22) Filed: May 25, 2007

(51) Int. Cl.
*G01S 13/00* (2006.01)
*G01S 13/08* (2006.01)
*G06K 9/00* (2006.01)
*G01C 21/00* (2006.01)

(52) U.S. Cl. .......... 342/52; 342/118; 342/146; 382/103; 382/154; 701/207; 701/213; 701/223

(58) Field of Classification Search ................ 342/26 R, 342/26 A, 26 B, 26 C, 26 D, 52, 70–72, 118, 342/139, 140, 146, 175; 382/103, 154; 340/995.1–995.28; 701/117, 207, 208, 218, 701/223
See application file for complete search history.

(56) References Cited

U.S. PATENT DOCUMENTS

| | | | | |
|---|---|---|---|---|
| 5,341,142 A * | 8/1994 | Reis et al. | | 342/64 |
| 5,742,699 A * | 4/1998 | Adkins et al. | | 382/107 |
| 6,233,522 B1 * | 5/2001 | Morici | | 701/208 |
| 6,236,351 B1 * | 5/2001 | Conner et al. | | 342/26 B |
| 6,414,712 B1 * | 7/2002 | Wanielik et al. | | 348/118 |
| 6,442,476 B1 * | 8/2002 | Poropat | | 701/207 |
| 6,563,452 B1 * | 5/2003 | Zheng et al. | | 342/26 R |
| 6,744,397 B1 * | 6/2004 | Hager et al. | | 342/55 |
| 6,771,207 B1 * | 8/2004 | Lang | | 342/26 R |
| 6,850,183 B2 * | 2/2005 | Reeves et al. | | 342/22 |
| 6,965,342 B2 * | 11/2005 | Klausing et al. | | 342/52 |
| 7,049,998 B1 * | 5/2006 | Frady et al. | | 342/52 |
| 7,176,830 B2 * | 2/2007 | Horibe | | 342/70 |
| 7,257,478 B2 * | 8/2007 | Sugano | | 701/96 |
| 7,486,291 B2 * | 2/2009 | Berson et al. | | 345/427 |
| 7,619,626 B2 * | 11/2009 | Bernier | | 345/427 |
| 7,880,668 B1 * | 2/2011 | Krause et al. | | 342/75 |
| 7,982,767 B2 * | 7/2011 | Berson et al. | | 348/144 |
| 2002/0049530 A1 * | 4/2002 | Poropat | | 701/207 |
| 2004/0046690 A1 * | 3/2004 | Reeves et al. | | 342/175 |
| 2004/0083035 A1 * | 4/2004 | Ellis | | 701/1 |
| 2004/0095999 A1 * | 5/2004 | Piehl et al. | | 375/240.16 |
| 2004/0105573 A1 * | 6/2004 | Neumann et al. | | 382/103 |
| 2004/0105579 A1 * | 6/2004 | Ishii et al. | | 382/154 |
| 2004/0247174 A1 * | 12/2004 | Lyons et al. | | 382/154 |
| 2005/0119828 A1 * | 6/2005 | Lahn | | 701/223 |

(Continued)

*Primary Examiner* — John Sotomayor
*Assistant Examiner* — Peter Bythrow
(74) *Attorney, Agent, or Firm* — Howard IP Law Group, PC

(57) ABSTRACT

A method for determining, in three dimensions, the location of a moving ground object observed in a region by a video camera. A terrain map supplies altitude for the latitude and longitude of each terrain point. The terrain information is combined with camera location, field of view, and orientation to produce a computed terrain map relative to the camera. A video analytics step processes the video and locates moving target(s) in two Cartesian coordinates. The coordinates are processed with the camera information to produce target location in terms of azimuth and elevation angle. The computed map information is combined with the angular target location to produce latitude, longitude, and altitude of the target. The target location information is used for further investigation or to attack the target. Also, a method for determining the third dimension of a 2-D radar track to cue a camera or fuse with camera data.

20 Claims, 13 Drawing Sheets

U.S. PATENT DOCUMENTS

2005/0149251 A1* 7/2005 Donath et al. ................ 701/200
2006/0238536 A1* 10/2006 Katayama et al. ............ 345/427
2007/0075892 A1* 4/2007 Horibe ........................... 342/70
2011/0001657 A1* 1/2011 Fox et al. ...................... 342/107

* cited by examiner

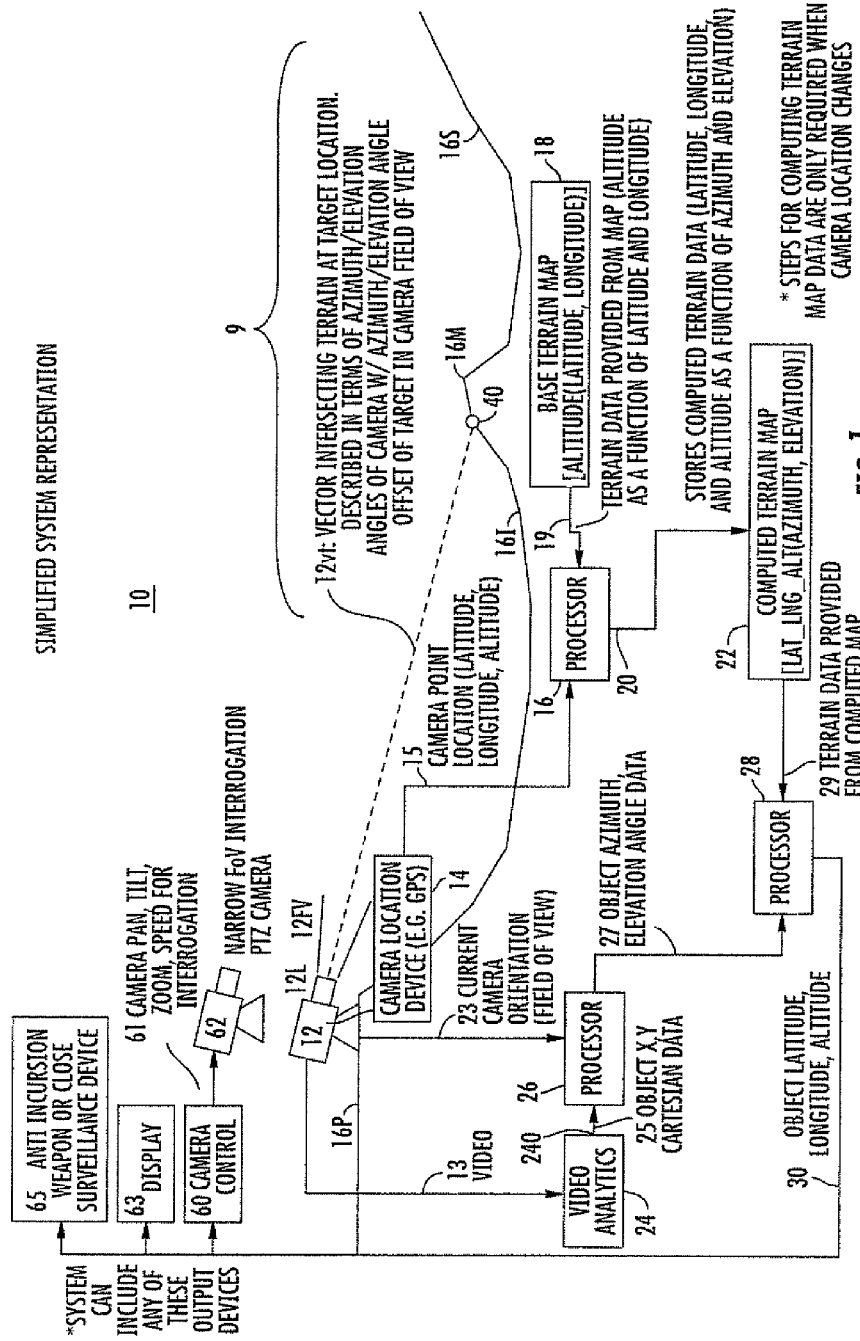

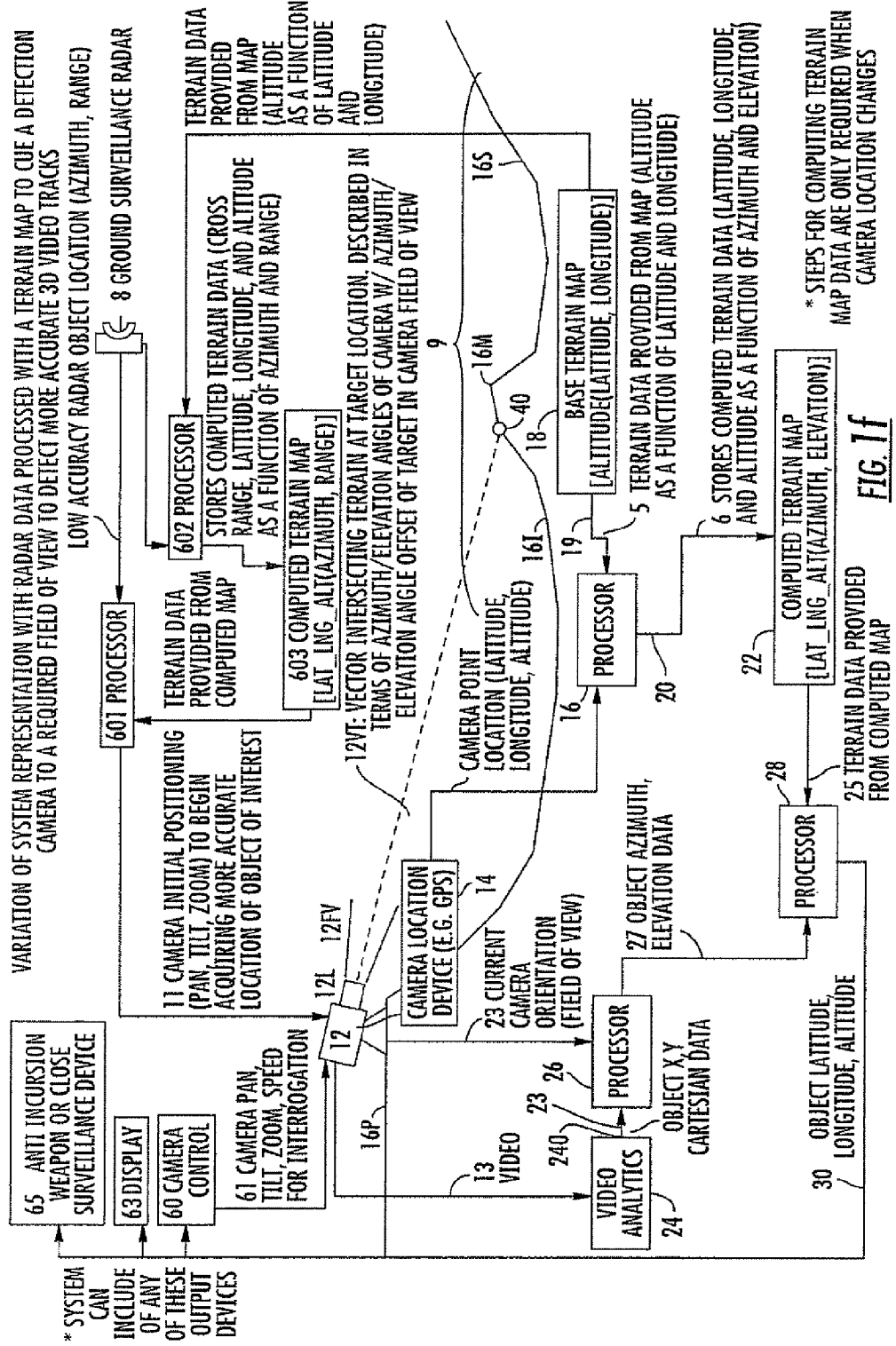

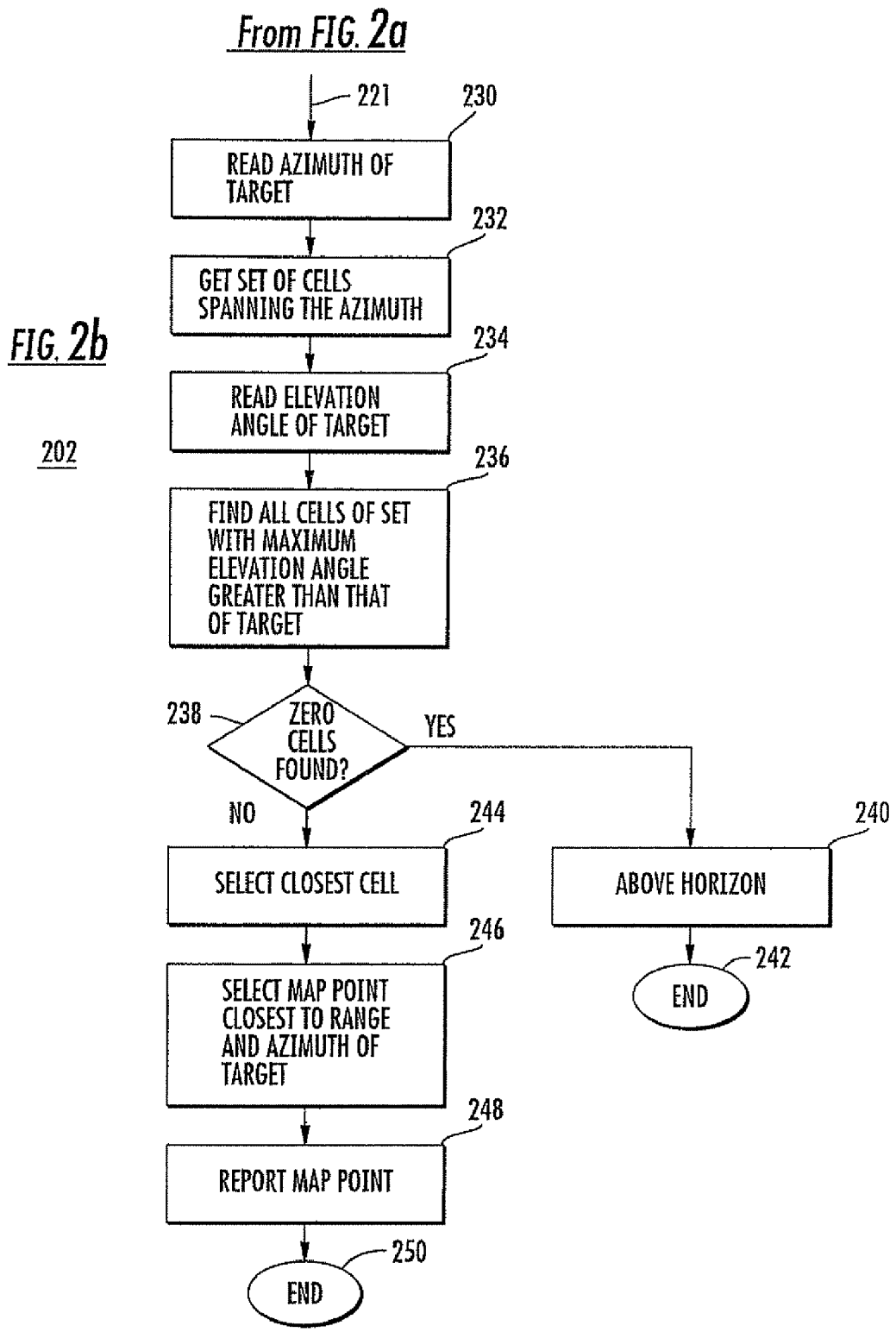

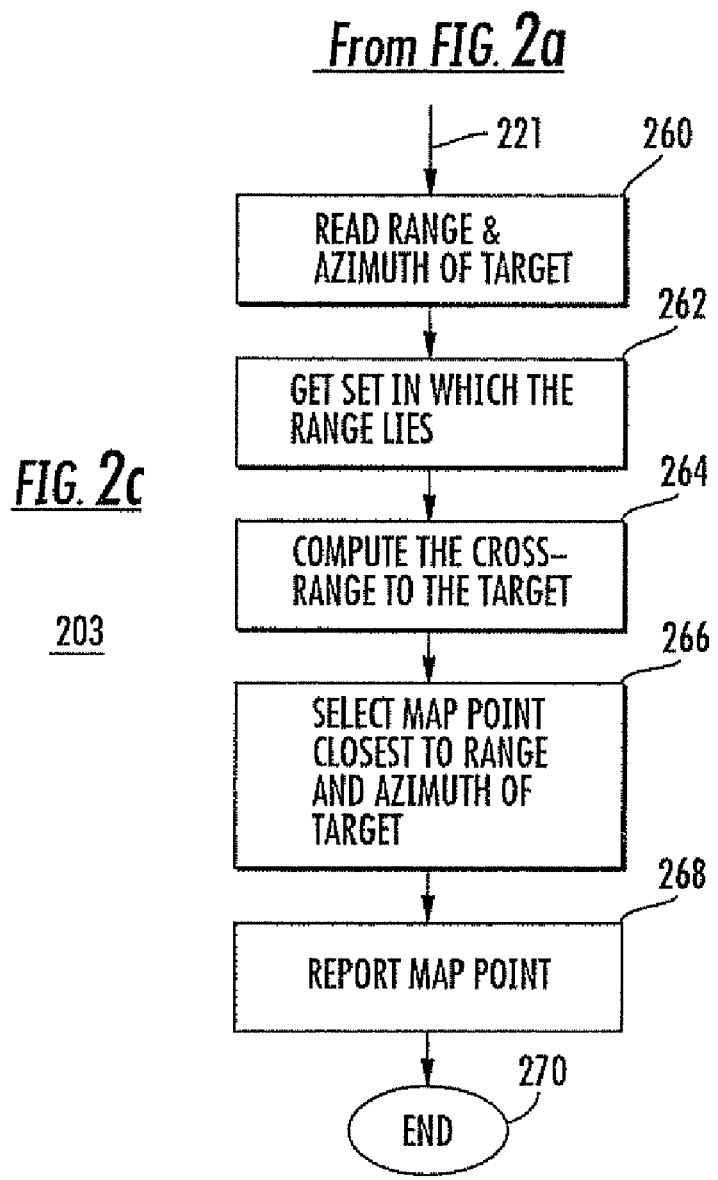

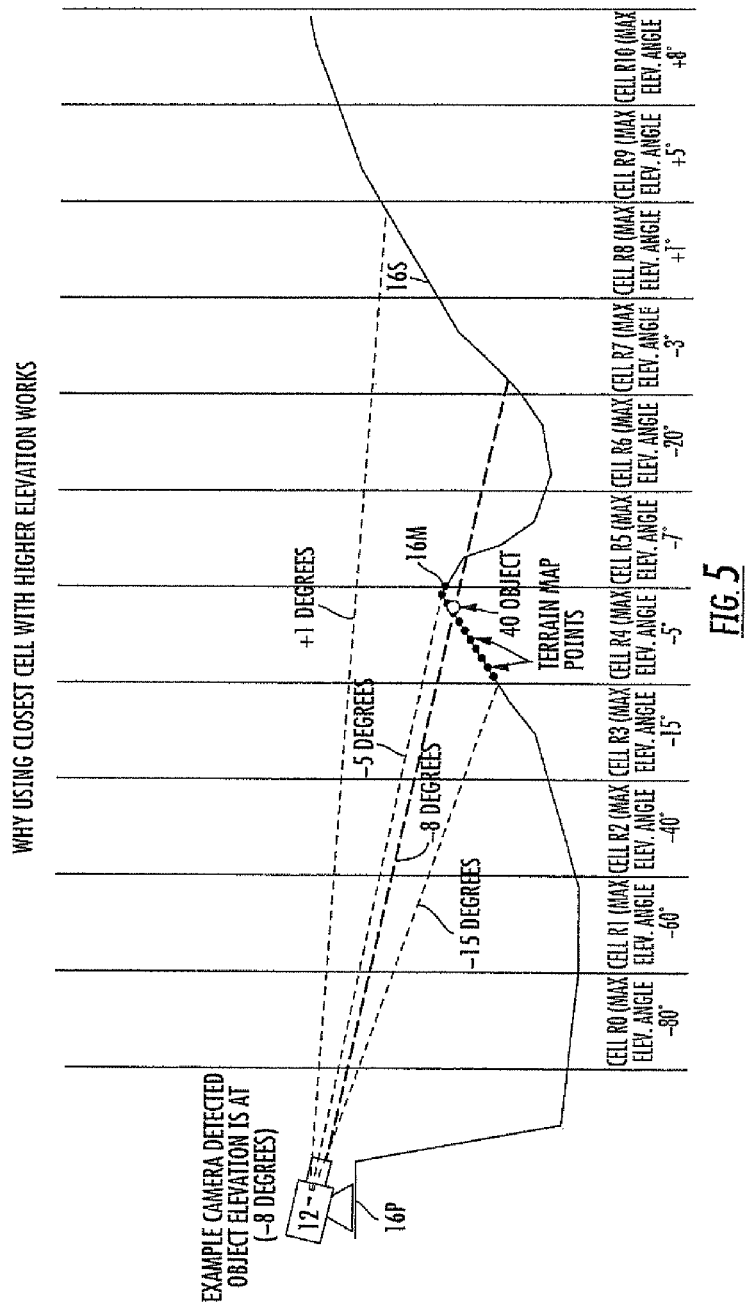

DETERMINATION OF THE THREE-DIMENSIONAL LOCATION OF A TARGET VIEWED BY A CAMERA

FIELD OF THE INVENTION

This invention relates to the determination of the three-dimensional location of a target in known terrain from sensed two-dimensional information.

BACKGROUND OF THE INVENTION

Homeland security has become of more than passing interest. One aspect of security involves surveillance of regions near borders to be protected from invasion, whether the invasion is (a) by hostile troops seeking to enter and attack a region to be protected or'(b) by undocumented or criminal persons, as might occur at the U.S.-Mexican border. One of the problems with such surveillance is that the regions under surveillance may be large, and the manpower available to perform the surveillance may be small. The availability of personnel to counter a detected incursion is a different issue. When the number of eyes available to perform surveillance or to survey is small, there is the possibility, or even the likelihood, that some incursions will not be noticed. Even when a large number of eyes is available, the relative infrequency of incursions may lead to momentary inattention, which again can lead to unnoticed incursions.

As a result, attention has been directed to technological means for surveillance. One possible solution is to place small ground proximity or movement sensors in the region to be surveyed, and to radio to a human-attended center when movement is detected. One disadvantage of this is that some of the sensors might have to be placed on the sovereign territory of another, which might not be possible. In addition, deploying such sensors over many miles along, and over suitable depth of, a border will be quite expensive. Not all the terrain to be protected will be amenable to use of a single type of proximity sensor, so multiple types might be required. Also, such sensors have the disadvantage that battery power would be required, and the changing of batteries in a large plurality of sensors scattered over a region in turn requires substantial manpower. Even if ground proximity sensors were to be deployed, they tend to be susceptible to false alarms such as animal movement (or even to movement of tree roots along the northern border). Historically, ground proximity sensors have been poor performers.

A radar system can survey a region which includes sovereign territory of another, and can provide a current location and speed of an object, and the data can be stored to provide a track (history of locations). Ground Surveillance Radar (GSR) has a long history of use for surveillance, and so constitutes a mature technology. Some of these radars are easy to set up or install using trained personnel. Moving target detection for radar is well known, and can detect objects moving with some radial velocities relative to the radar. Ground surveillance radar (GSR) that is available for border surveillance provides a two-dimensional detection capability, which is to say that it only identifies the location of an object by range and azimuth. Additionally, the GSRs available for border surveillance tend to have slow update rates (half a minute to more than a minute per scan), and also limitations in detection of objects with low radial velocity (relative to the radar location). The two dimensional object location, together with the slow update rate, make radar data somewhat difficult to use for the important task of cueing narrow field of view interrogation cameras to closely observe the target of interest. In addition, significant limitations to angular resolution and range accuracy result in the detection mode of operation not being as effective as the tracking modes. Additional limitations of radar border surveillance include possible inability to detect objects through vegetation and under various clutter conditions. A major disadvantage of radar systems is that they cannot, in general, identify an object. For example, a moving object smaller than a vehicle might be a human intruder, or it might be an animal. Indeed, a low-flying bird might give rise to concern, since radar generally cannot determine the shape of an object. Radar systems undesirably tend to require skilled operators and maintenance personnel.

Cameras can also be used for surveillance. Cameras, like radar systems, have the advantage of being able to extend their sensing capabilities across borders. As with GSR, cameras can be installed and set up by relatively unskilled personnel. They also cost less than radar systems. Cameras have the advantage of being capable of reporting the shape of an object within their fields of view, so can, in principle, tell the difference between an animal and a human. In addition, a video surveillance approach allows for use of infrared (IR) technology to detect warm bodies moving through vegetation and other similar obstructions, as the warm bodies provide enough of a difference between pixels for detection by video analytics. On the other hand, cameras have a problem similar to that of radar, in that they provide only a two-dimensional (azimuth and elevation) representation of a three-dimensional world. Another disadvantage of cameras for surveillance use is that the camera can only "see" objects which subtend a substantial portion of the field-of-view. That is, if the object is small and at a significant distance from the camera, its image may be so small as to be indistinguishable from the background. If a zoom lens function is directed toward the object so as to effectively enlarge the object in the field of view, the field of view is narrowed so that other targets or objects may be able to move through the region without being imaged. Yet a further disadvantage of cameras for surveillance is that the video analytics processing, which is well-known processing for detecting motion from frame-to-frame variations in each pixel, tends to require the operator to configure each individual field of view to be monitored so that detected objects can be converted to geospatial coordinates. This configuration task might take several hours, depending on the operator. Because of this setup time, COTS video analytics products are primarily useful at fixed installations, and tend to be left in position (not moved) once they are set up.

Improved or alternative surveillance arrangements are desired.

SUMMARY OF THE. INVENTION

A method according town aspect of the invention is for determining, in three dimensions, the location of a moving terrestrial or ground object observed in a region by a video camera. A terrain map supplies altitude for the latitude and longitude of each terrain point. The terrain information is combined with camera location, field of view, and orientation to produce a computed terrain map relative to the camera. A video analytics step processes the video and locates moving target(s) in two Cartesian coordinates. The coordinates are processed with the camera information to produce target location in terms of azimuth and elevation angle. The computed map information is combined with the angular target location to produce latitude, longitude, and altitude of the target. The target location information is used for further investigation or to attack the target. According to another aspect of the invention, a method for determining the third dimension of a 2-D radar track to cue a camera or fuse with camera data.

A method according to an aspect of the invention is for determining the location of a moving object in a region of interest. The method comprises the steps of observing the region of interest with a camera to produce a frame-sequential video signal representing at least a part of the region of interest. Geospatial coordinates of the location of the camera, and information relating to the azimuth angle, elevation angle, and field of view of the camera are provided. The video signal is applied to video analytics processing for detecting an object(s) which move(s) from frame to frame of the video signal, and for identifying the location in a two-dimensional Cartesian coordinate system of such an object. The location in a two-dimensional Cartesian coordinate system of an object which moves from frame to frame of the video signal is converted to a location expressed in terms of azimuth and elevation angle. A computed map is provided that includes the altitudes of geospatial coordinate points, at least in the region of interest, together with computed range, azimuth, and elevation from the camera location to each computed map point. The computed map information is processed together with the location of the object expressed in terms of azimuth and elevation angle and together with the location of the camera and information relating to the azimuth angle, elevation angle, and field of view of the camera, for producing information relating to the location of the moving object in three dimensions. The information may be in the form of longitude, latitude, and altitude. The three-dimensional location of the moving object can be displayed, or a zoom camera may be directed toward the location for better identification, or a weapon or surveillance device may be directed toward the location.

In a particular mode of this aspect of the invention, the step of providing a computed map including the altitudes of geospatial coordinate points, at least in the region of interest, together with computed range, azimuth, and elevation from the camera location to each computed map point, comprises the step of providing a terrain map including the altitudes of geospatial coordinate points, at least in the regions of interest. These geospatial coordinate points may be expressed in terms of longitude and latitude. The terrain map information is processed together with the location of the camera and information relating to the azimuth angle, elevation angle, and field of view of the camera, to produce a computed map including latitude, longitude and altitude as a function of azimuth and elevation.

A mode according to this aspect of the invention, for performing close surveillance of a moving object in a region of interest, comprises the steps of additionally observing the region of interest with radar to produce a two-dimensional radar track (including at least range and azimuth) of an object in the region of interest, and providing geospatial coordinates of the location of the radar. This mode provides a further map including the altitudes of geospatial coordinate points, at least in the region of interest, together with computed range, azimuth, and elevation from the radar location to each map point. The further map is processed together with the location of the radar track in range and azimuth angle and also together with the location of the radar, for producing three-dimensional radar object location information. A camera is cued with the three dimensional radar object location information so as to observe the three dimension object location with the camera in order to further identify the target.

An alternative mode according to this aspect of the invention, for performing close surveillance of a moving object in a region of interest, comprises the steps of additionally observing the region of interest with radar to produce a two-dimensional radar track, including at least range and azimuth, of the object in the region of interest, and providing geospatial coordinates of the location of the radar. This alternative mode also includes the providing of a further map including the altitudes of geospatial coordinate points, at least in the region of interest, together with computed range, azimuth, and elevation from the radar location to each map point. The further map is processed together with the location of the radar track in range and azimuth angle and together with the location of the radar, for producing three dimensional radar object location information. The processed three dimensional radar object location is correlated to the processed three dimensional camera object location, and the information relating the object location, as generated by the radar and the camera, is fused to improve the accuracy of the object location. In one version of this mode, a surveillance craft is guided toward the three-dimensional location.

According to a further aspect of the invention, the step of processing the terrain map together with the location of the object in azimuth and elevation angle together with the location of the camera and information relating to the azimuth angle, elevation angle, and field of view of the camera, for producing information relating to the location in three dimensions of the moving object, includes the step of identifying a plurality of contiguous or juxtaposed azimuth-range cells covering the terrain points available from the terrain map, so that plural terrain points lie in each range cell. The range, azimuth and elevation relative to the camera location are calculated for each terrain point. The azimuth-range cell in which the target is located is determined. That terrain point within that one of the azimuth-range cells which is closest to the target is identified. That terrain point within that one of the azimuth-range cells which is closest to the target is deemed to be the location of the target.

BRIEF DESCRIPTION OF THE DRAWING

FIG. 1a is a simplified notional and block representation of a system including an aspect of the invention for using a camera to locate a target, FIG. 1f is similar to FIG. 1d, but illustrates separate processors for performing processing for cueing the camera.

FIGS. 2b and 2c are corresponding flow charts or diagrams of other portions of the control or processing system;

FIG. 5 is a simplified elevation view of terrain similar to that of FIG. 1, subdivided into a plurality of ranges, and showing why the closest range cell having certain properties is the location of a target.

DESCRIPTION OF THE INVENTION

Figure 1B:
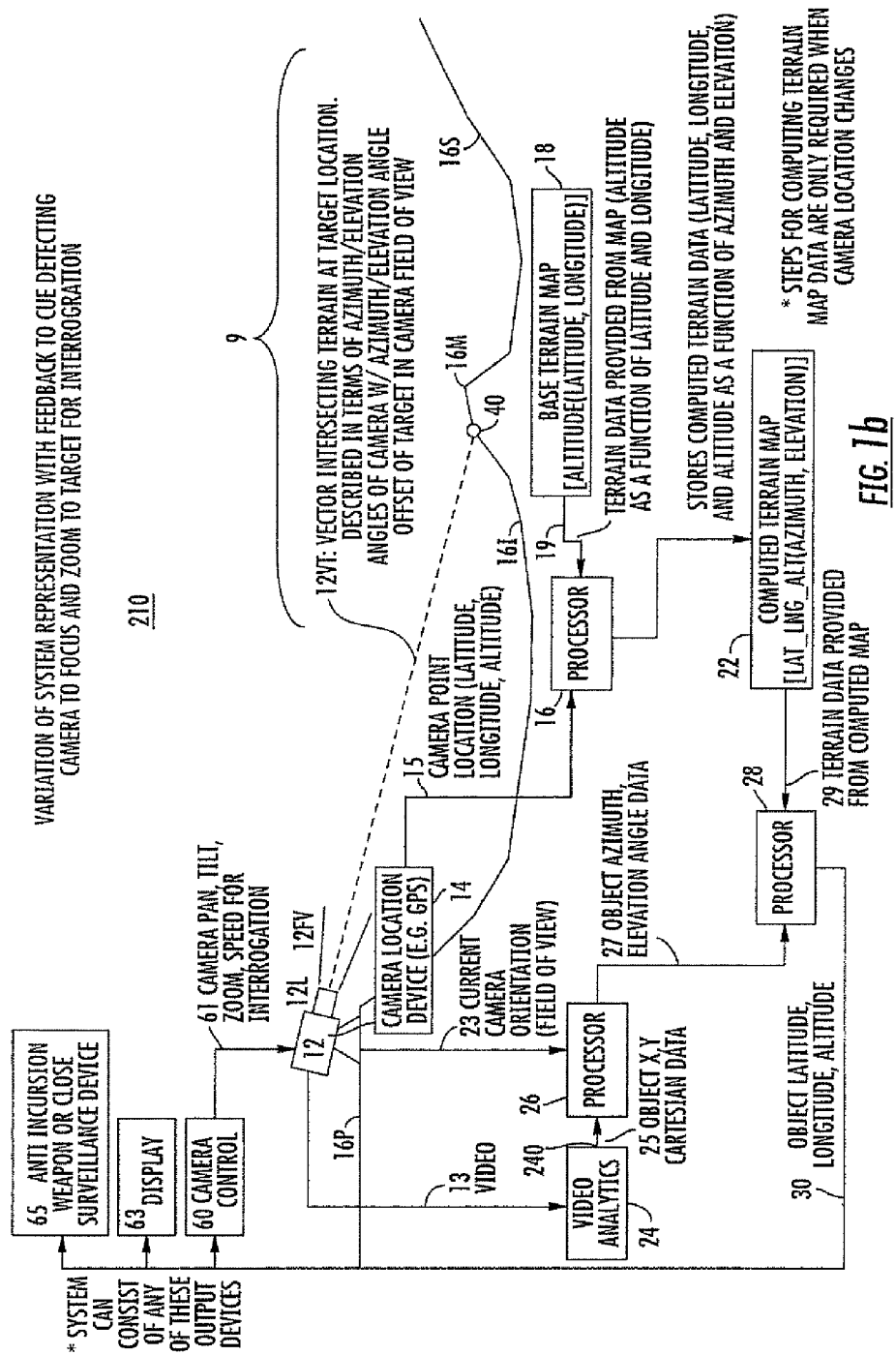
FIG. 1b is a simplified notional representation similar to FIG. 1a, in which the target location information is used to cue or control an adjustable camera initially used for locating the target to closely examine the target.

FIG. 1a represents a system 10 according to an aspect of the invention. The system includes a camera 12 with a lens 12L mounted on a generally planar terrain region 16p. The camera 12 with lens 12 has an instantaneous field of view represented by lines 12fv, which are illustrated as being centered on a field-of-view axis 12vt (but do not necessarily have to be centered). The field of view 12fv encompasses a region of interest 9 which includes a mound 16m, a slope 16s, and an intermediate region 16i. Camera 12 is associated with a cameral location device 14, such as a global positioning system (GPS) receiver, which determines the camera location in terms of latitude, longitude, altitude, and heading, which aids in determining the camera pointing direction in terms of the field of view. The camera 12 location in terms of latitude, longitude, and altitude is transmitted from camera location device 14 by way of a path 15 to a processor illustrated as a block 16. Processor 16 also receives information by way of a path 19 from a base terrain map illustrated as a block 18. The information provided by base terrain map 18 includes information about that portion of the region of interest 9 which is within the field-of-view 12fv, and preferably also includes information about that portion of the region of interest 9 which might be viewed by camera 12 if the field of view or the direction of the camera changes. The information provided by base terrain map 18 includes altitude for each map point (that is, altitude for each latitude/longitude pair). Processor 16 uses the data from paths 15 and 19 to generate computed terrain data. The computed terrain data includes latitude, longitude, and altitude as a function of camera azimuth and camera elevation (or depression) angle. The computed terrain data generated by processor 16 is applied over a path 20 and stored in a Computed Terrain Map 22. These steps of determining the camera location, reading of the base terrain map, and generating the computed terrain map need only be performed when the Camera 12 and its Camera Location Device 14 changes its location. Camera location device 14 may be left with the camera, or it may be taken away once the camera location information is generated and stored in association with processor 16.

Camera 12 of FIG. 1a produces frame-sequential video representing the two-dimensional scene within its field of view 12fv. The frame-sequential video is applied over a signal path 13 to a video analytics block designated 24. Video analytics block 24 does a pixel-to-pixel comparison of the video from the video stream, to identify motion from frame to frame in the pixel-to-pixel changes. Video analytics are well known, and commercial off-the-shelf (COTS) processors are available to perform this function. Video analytics block 24 produces, at its output port 24o, data representing the two-dimensional (2-D) or Cartesian coordinate locations of one or more moving objects.

According to an aspect of the invention, the data from output port 24o of block 24 of FIG. 1a, representing the two-dimensional location of the moving object(s) in the scene is (or are) applied over a path 25 to a further processing block 26. Processing block 26 also receives the camera orientation and field-of-view information by way of a path 23. Processing block 26 transforms the two-dimension Cartesian coordinates of the moving target to azimuth and elevation coordinates in a spherical coordinate system. The information about the Spherical angular coordinates of the moving target is applied by way of a path 27 to a further processor 28.

Processor Block 28 of FIG. 1a performs processing for combining the two-dimensional spherical-coordinate information from path 27 with the topological information (latitude, longitude, and altitude as a function of camera azimuth and camera elevation or depression angle) from path 29 to produce information relating to the location in three dimensions (3-D) of the moving object(s). That is, the location of the moving object is established in terms of latitude, longitude, and altitude. The location information can be forwarded by way of a path 30 to a block 60 for control of the pan, tilt, zoom, and speed of a camera, such as camera 62, which is capable of narrowing its field of view and of following the target in order to provide a better representation of the target. Alternatively, or in addition, the location information produced by processor 28 can be applied to a display, illustrated as a block 63, and/or an anti-incursion weapon or close surveillance device, represented as a block 65.

Arrangement 210 of FIG. 1b is similar to arrangement 10 of FIG. 1a, but differs in that the object or target latitude, longitude, and altitude as determined by processor 28 and applied to camera control block 60 is used to control, by way of a path 61, the pan, tilt, zoom, and speed of the camera 12. When a single camera is used in this fashion, there is a greater possibility that other targets will be missed during those intervals in which camera 12 is in a zoom mode with narrowed field-of-view. That is, someone can move across a portion of the region 9 of interest while the camera is closely examining another portion. This configuration is used when only a single camera is available and it is acceptable to temporarily stop detecting with the camera while it is used for close observation of a target.

Figure 1C:
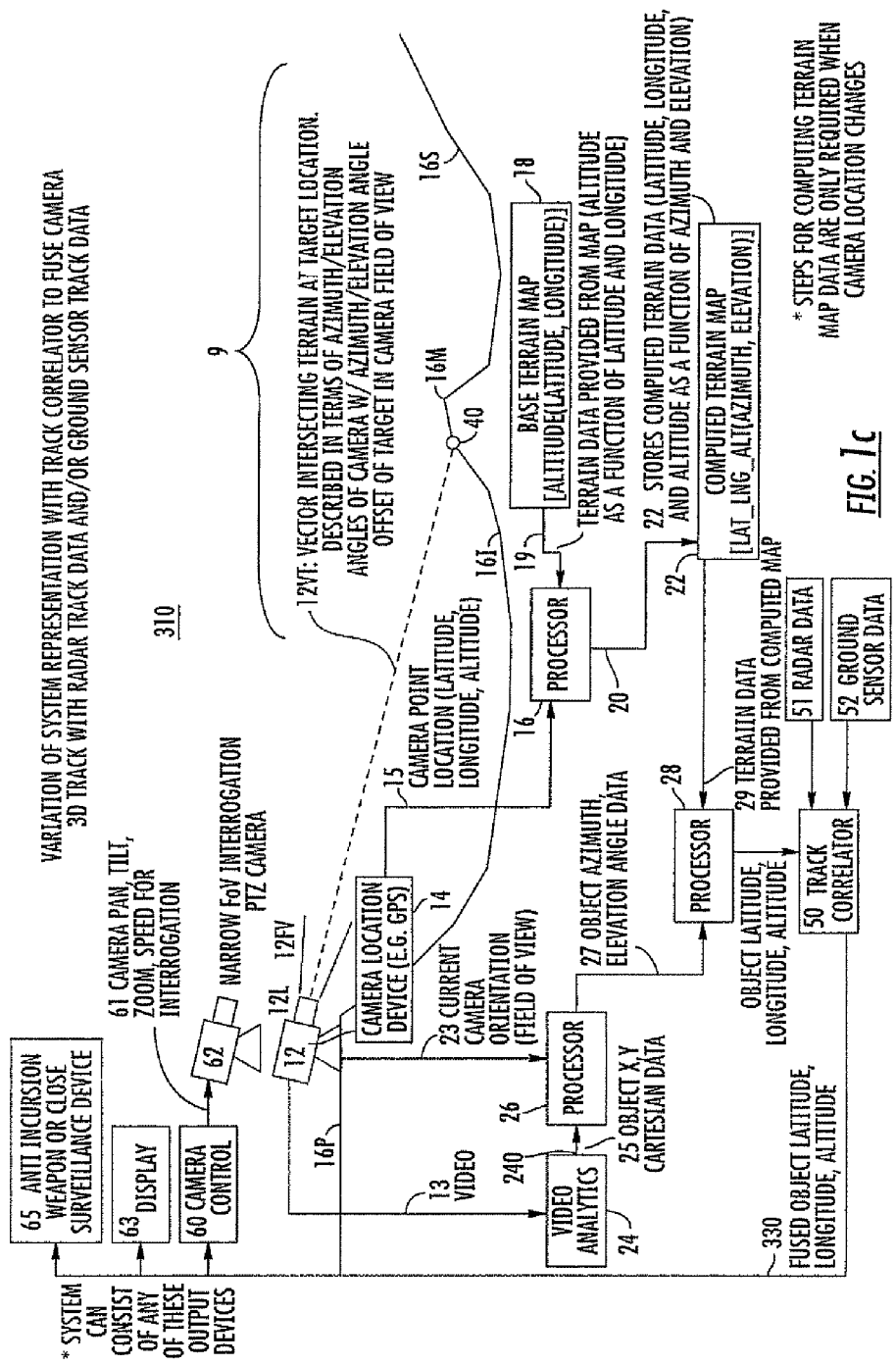
FIG. 1c is a simplified notional and block diagram similar to FIGS. 1a and 1b, further including additional target location source or sources, together with a correlator to fuse the target location data.

Arrangement 310 of FIG. 1c is similar to arrangements 10 and 210 of FIGS. 1a and 1b, respectively, but includes a source of surveillance information other than the camera of FIG. 1a. In particular, the arrangement 310 of FIG. 1c includes a source of radar data, as from a radar operating in the vicinity of region of interest 9, which is represented by a block designated 51. Additionally, or alternatively, the arrangement 310 may include a source of ground sensor data, as from a ground sensor field lying at least partially within the region of interest 9. The data from a radar or from a ground sensor system, or both, is applied to a correlator illustrated as a block 50. Correlator 50 also receives track information from processor 28, and fuses the information [in known fashion] to produce fused object latitude, longitude, and altitude information. The fused object information produced by block 50 is applied over a path designated 330 to one or all of a camera control block 60, a display 63, or an anti-incursion weapon or close surveillance device 65.

Figure 1D:
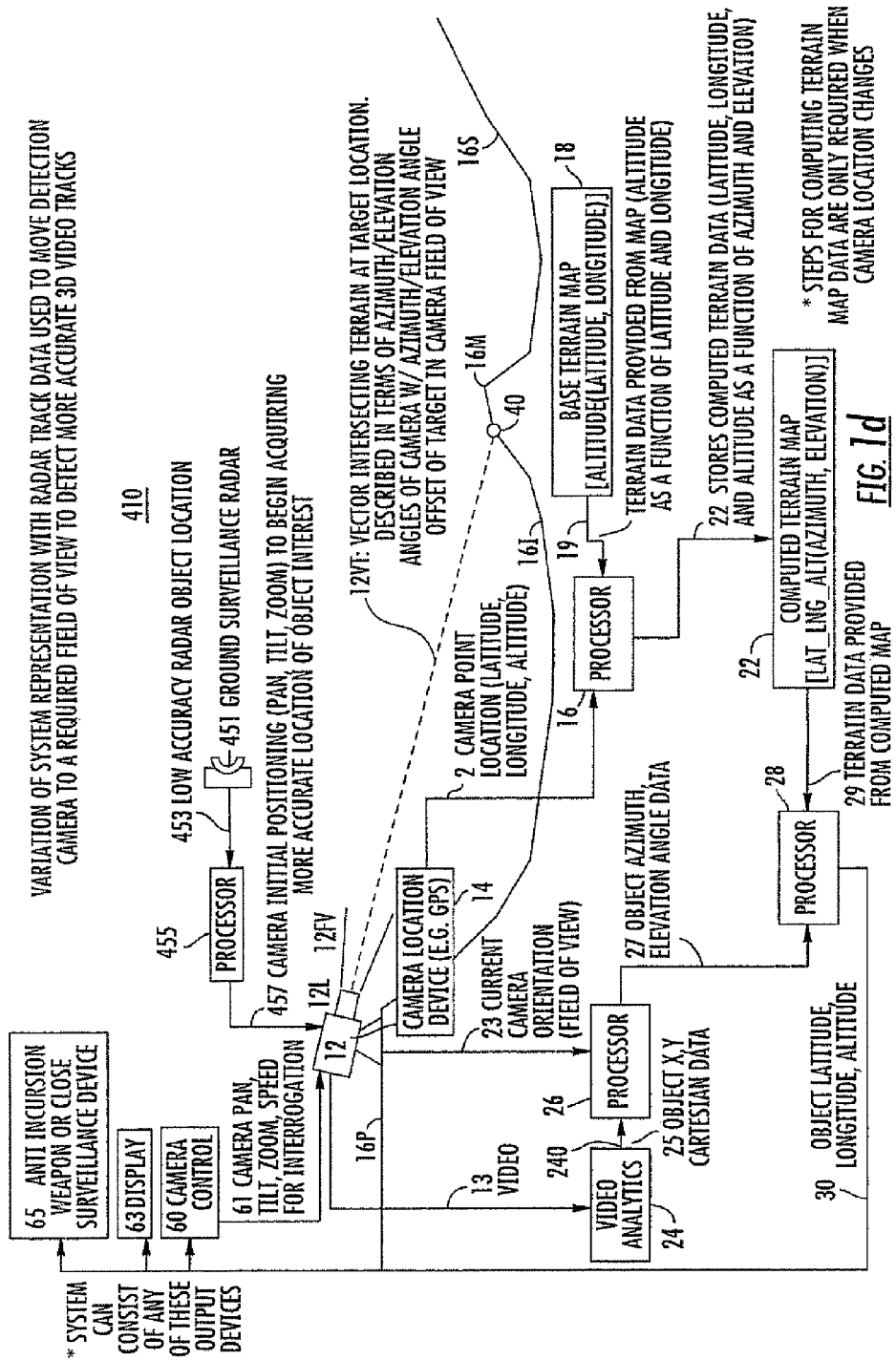
FIG. 1d is similar to FIGS. 1a and 1b, but further includes a source of radar data relating to the target, for controlling initial positioning of the target location camera.

Arrangement 410 of FIG. 1d is similar to arrangement 10 of FIG. 1a, but includes a further ground surveillance radar system illustrated as 451, which produces radar object location information on a path 453 to a processor 455. The radar object location information produced by radar 451 may be of relatively low accuracy by comparison with the location information produced by camera 12 in conjunction with processing. Processor 455 processes the radar information and may prioritize targets to produce camera 12 initial positioning control information. Camera 12 is then used to obtain more accurate object location information.

Figure 1E:
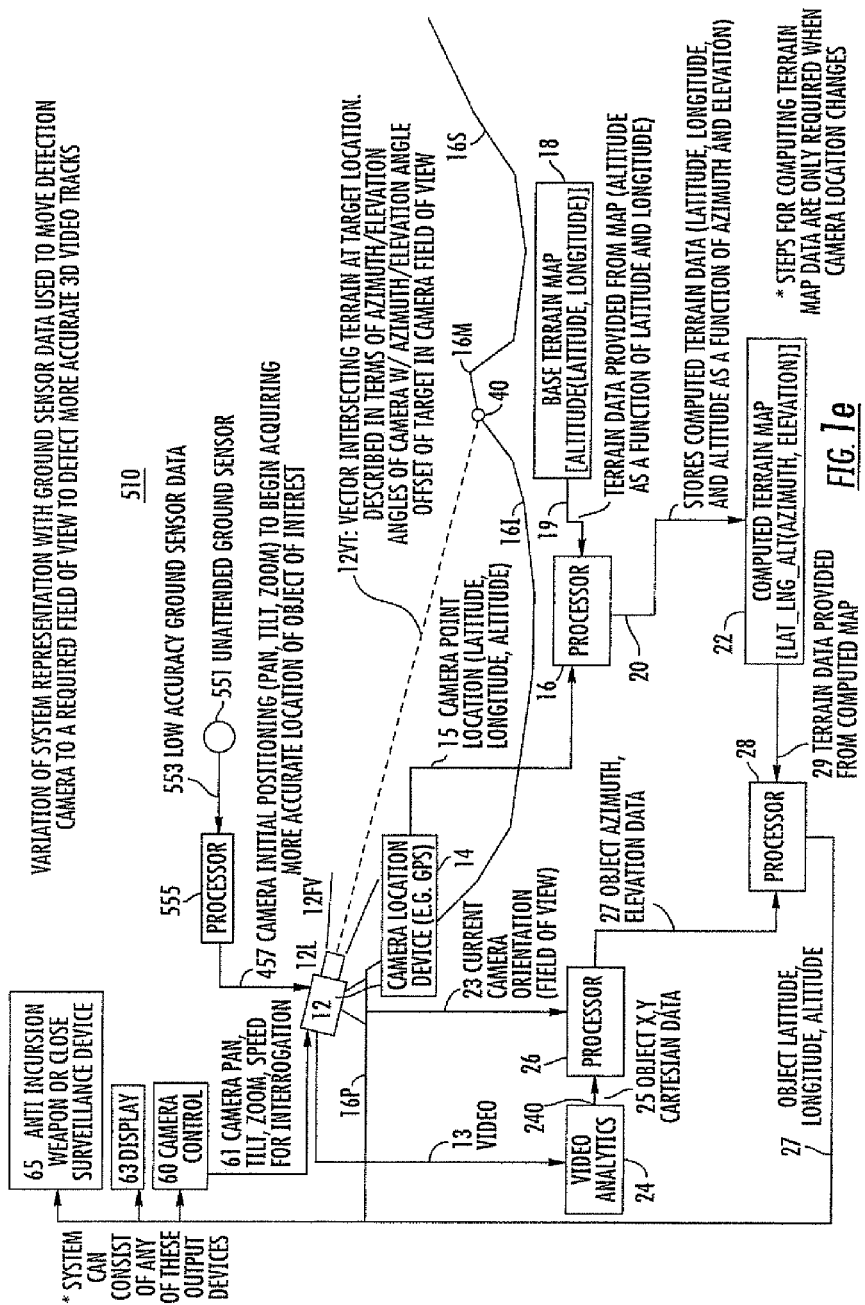
FIG. 1e is a simplified notional and block diagram similar to FIG. 1d, but using ground sensor information for initial positioning of the target location camera.

Arrangement 510 of FIG. 1e is similar to arrangement 410 of FIG. 1d, but differs in that sensor data, inherently of lower accuracy than that of a camera, is used for initial pointing of camera 12. More particularly, an unattended ground sensor or sensor set designated 551 produces target location information, which is provided by way of a path 553 to a processor designated 555. Processor 555 processes the location information from sensor or sensor set 551 to control the initial pointing position of camera 12 to obtain more accurate object location information.

Processing block 28 of any of FIGS. 1a, 1b, 1c, 1d, and 1e includes a utility algorithm that makes use of the computed terrain map of an area in conjunction with the processed two-dimensional azimuth and elevation camera information to determine the three-dimensional location (latitude, longitude, and altitude) of an object. The algorithm used in processor block 28 groups the map data into range/azimuth cells and locates the closest point in (or on) the map to the intersection of the target vector with the terrain as expressed by the map. The target vector may be imagined as being a vector extending from the point location of the camera, expressed as latitude, longitude, and altitude, heading in a direction based on the camera's orientation relative to North (azimuth, elevation) and the azimuth and elevation offset of the target object from the center of the field of view of the camera. This vector is represented in FIGS. 1a, 1b, 1c, 1d, and 1e by dash line 12vt. It is expected that the "drawing" or establishing of this vector results in intersection with the terrain map at the location of the object, and this location is illustrated as 40. An underlying assumption is that the object is not airborne or flying, but rather that it is supported by the Earth.

Figure 2A:
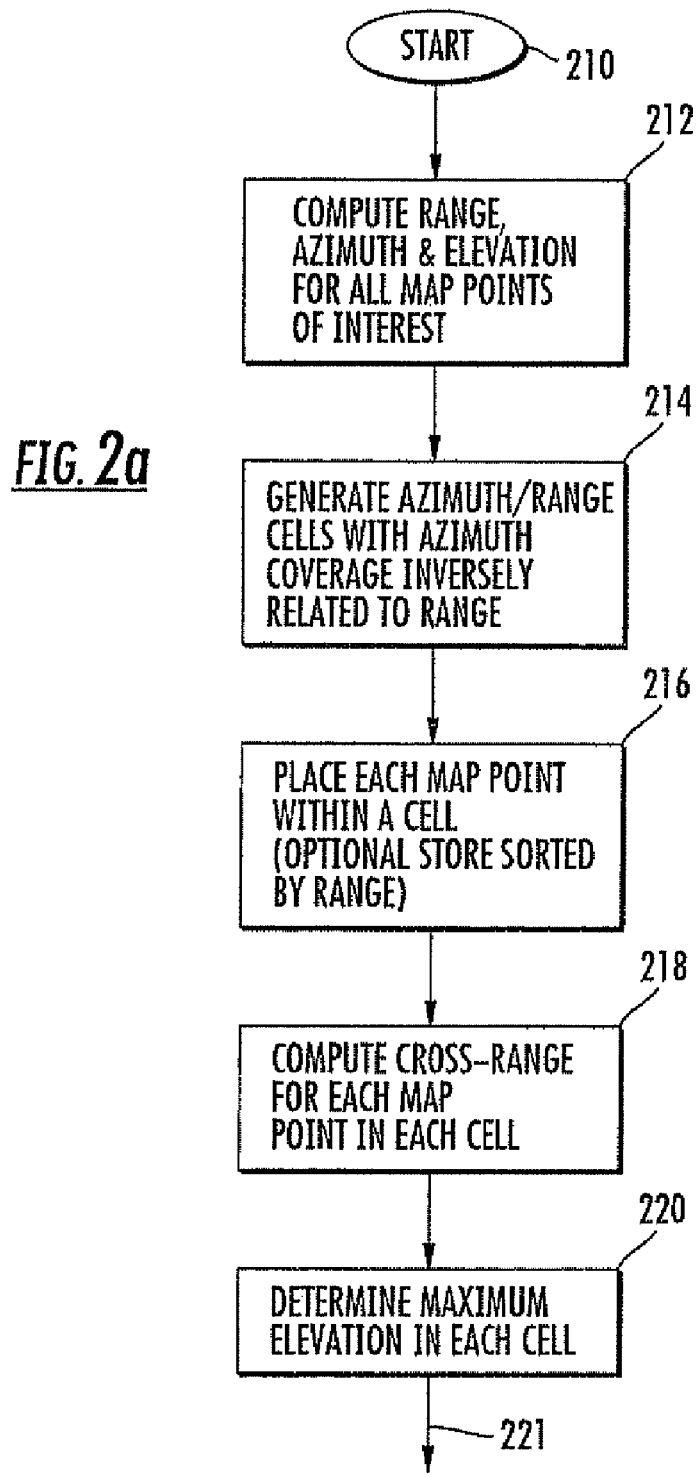
FIG. 2a is a simplified logic flow chart or diagram of a portion of a control or processing system for determining the location of a target from computed terrain information and from information provided by a camera such as that of FIGS. 1a, 1b, 1c, 1d, 1e, 1f and/or 1g.

FIG. 2a is a simplified representation of a portion 201 of a computer algorithm according to an aspect of the invention for use in processing for determining the location of an object. Portion 201 of the algorithm is performed in processor 16 of FIGS. 1a, 1b, 1c, 1d, and 1e. In FIG. 2a, the logic starts at a START block 210, and proceeds to a block 212. Block 212 represents computations that may be performed in processor 16 of FIG. 1a. Processor 16 receives base terrain map information in the form of a two-dimension grid of altitude values as a function of latitude and longitude. Block 212 of FIG. 2a represents the computation, for each base map 18 point in the region of interest, of the range, azimuth and elevation angle (relative to the camera 12 location) of that point. Block 214 represents the generation of azimuth/range cells covering the region of interest, with the azimuth extent of each azimuth/range cell being inversely related to the range. For example, one possible distribution might include

| Cell 1: | 00 to 45 degrees | 0-250 meters |
| Cell 2: | 45 to 90 degrees | 0-250 meters |
| Cell 3: | 00 to 05 degrees | 250-2000 meters |
| Cell 4: | 05 to 10 degrees | 250-2000 meters |
| Cell 5: | 00 to 02 degrees | 2000-6000 meters |
| Cell 6: | 02 to 04 degrees | 2000-6000 meters |

Figure 3:
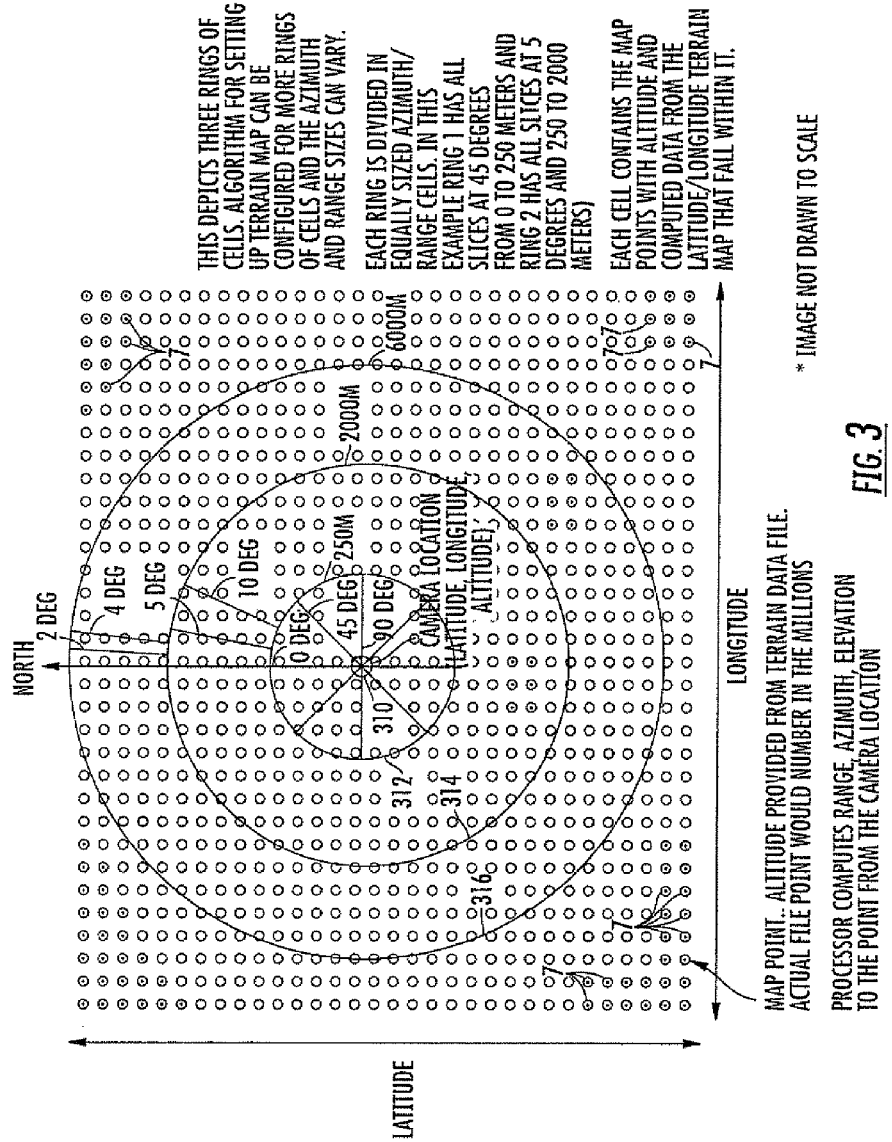
FIG. 3 is a simplified plot or plan view of terrain centered on a camera location, illustrating concentric range circles, angular sectors having magnitude dependent upon range, and specific terrain locations, some of which are illustrated as dots.

FIG. 3 is a simplified plan representation of the region 9 of interest, which is covered with many terrain or map points, some of which are illustrated and designated 7. FIG. 3 also illustrates some of the azimuth/range cells covering the region of interest, with the azimuth extent of each azimuth/range cell being inversely related to the range. In FIG. 3, the center 310 of the concentric circles 312, 314, and 316 represents the location of the camera 12 of FIGS. 1a, 1b, 1c, 1d, and/or 1e. The smallest circle, namely circle 312, represents a range of 250 meters from the camera, pursuant to the example, while circles 314 and 316 represent ranges of 2000 and 6000 meters, respectively. Within the 250-meter range circle 312, azimuth is subdivided into 45° sectors, three of which are labeled 0 deg, 45 deg, and 90 deg. In the intermediate range lying between the 250- and 2000-meter circles 312 and 314, respectively, azimuth is divided in 5° increments, and some of the sectors are designated 5° and 10°. Similarly, the range increment lying between the 2000-meter circle 314 and the 6000-meter circle 316 azimuth is divided into sectors with 2° increments, only two of which are illustrated. Thus, two of the sectors in this range interval are designated 2° and 4°. Each range cell includes a large number of terrain or map points 7. The setup associated with FIG. 3 is run once, and need not be re-run until such time as the location of the camera is changed, as the range, azimuth, and elevation are relative to a specific location.

Following the operations of block 214, the logic 201 of FIG. 2a flows to a block 216, which represents the computation of range, azimuth, and elevation from camera point 310 (FIG. 3) to the latitude, longitude, and altitude of each map point in the terrain grid. This computation may be made in processor 16 of FIG. 1a. The latitude, longitude and altitude in the terrain grid are then stored or placed in the appropriate one of the range/azimuth cells. Thus, the altitude information of the terrain grid point does not affect the range/azimuth cell in which the information is stored, but the altitude information is available for each point in each range/azimuth cell. There may be many map points in each azimuth/range cell. Some of the map points are indicated by dots in FIG. 3. Basically the azimuth/range cells are organized in terms of range and azimuth, and are used to store map points with values computed from block 212 of FIG. 2a. These map points originated from a two dimensional latitude/longitude grid. The organization of the cells and storing the points in the cells provides an efficient means for looking up points, which is important since there may be millions of points to go through for a 10 km square area. Thus, range, azimuth, and elevation are computed from the camera point location to each latitude, longitude, and altitude in the grid to get the values and they are then stored in the appropriate cells. These sets of values are stored in computed terrain map of FIG. 1a. Optionally, the points may be stored sorted by range.

Figure 4:
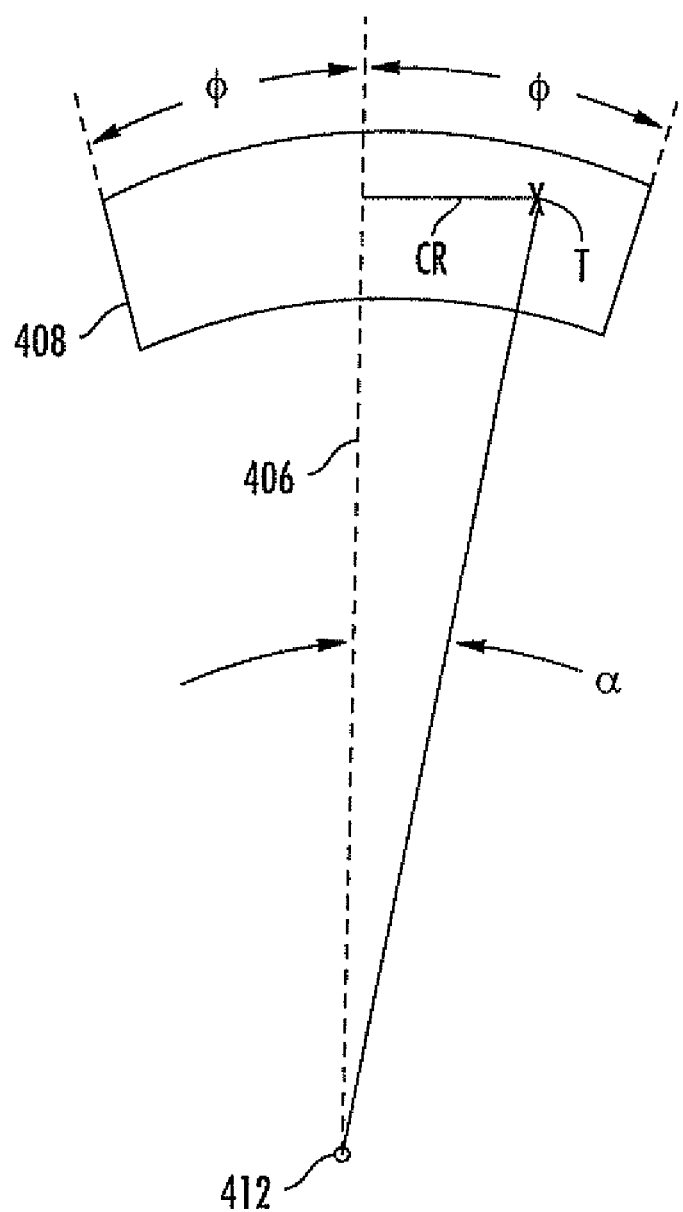
FIG. 4 is a simplified notional map useful in explaining cross-range.

From block 216, the logic portion 201 of FIG. 2a flows to a block 218, which represents the calculation of cross-range for each map point in each cell. The plan view of FIG. 4 illustrates the geometry associated with determination of the cross range. In FIG. 4, the location of the camera is designated 412. The cell in which the target is located is a curvilinear region designated 408. Dash line 406 represents a line extending from camera location 412 which passes through the angular center of the cell 418, as suggested by equal angles Φ between line 406 and the cell edges. In FIG. 4, the location of the target within the cell is designated T. A line 404 extending from camera location 412 to the target location T makes an angle α with the cell centerline 406. The cross-range value CR is determined as $$\text{Cross\_range} = \text{range} * (az_{point} - az_{center\ of\ cell}) * \text{pi}/180° \quad (1)$$

where:

$az_{point}$ is the azimuth angle of the map point at which the target is located, measured in degrees; and $az_{center\ of\ cell}$ is the azimuth of the center point of the cell 408, measured in degrees.

Block 220 of FIG. 2a represents determination of the elevation angle for each point lying within each cell, and the selection, from among all such elevation angles in the cell, of the maximum value (the highest point). Storing a maximum elevation for the cell of points helps with determining if one cell is obstructing the view of another cell "behind it" if the elevation angle to view it is lower. It should be noted that the logic steps 201 of FIG. 2a need only be performed when the camera location changes.

The logic 201 flows from FIG. 2a by way of path 21 to block 230 of FIG. 2b. The processing steps 202 of FIG. 2b are performed in processor block 28 of FIGS. 1a, 1b, 1c, 1d, and 1e. Block 230 of FIG. 2b represents the reading, in processor 28 of FIGS. 1a, 1b, 1c, 1d, and 1e of the 2-D azimuth of the target derived in processor block 26 from the information contained in the object X,Y Cartesian data from the Video Analytics block 24. Block 232 of FIG. 2b represents the selection or identification of the set of all cells (in all range sets) that span the 2-D azimuth of the target. Block 234 represents the reading of the 2-D elevation of the target using camera point location information and orientation information to produce the azimuth and elevation angle of the target. Block 236 represents the determination or identification of all the cells of the set in which the maximum elevation angle is greater than the elevation angle of the target output from Processor 26. Decision block 238 determines if there are a finite number of cells (one or more cells) having maximum elevation angle greater than the target elevation angle. If no cells of the set have maximum elevation angle greater than the target elevation angle, the target is deemed to be above the horizon, so the logic of FIG. 2b leaves decision block 238 by the YES output and flows to an "above horizon" determination block 240, and thence to an END block 242. If one or more cells are found by decision block 238 that have maximum elevation angles greater than the 2-D elevation angle of the target, the logic leaves decision block 238 by the NO output, and flows to a block 244. Block 244 represents the selection of that cell, from among those having maximum elevations greater than the sensed 2-D elevation, which is closest to the sensor (the camera in this example). The logic of block 236 iterates through the cells until the first one is found which has a maximum elevation angle greater than the target elevation angle.

From block 244 of logic 202 of FIG. 2b, the logic flows to a block 246. Block 246 represents the selection, from within the closest cell selected in block 244, of the map point which is closest in azimuth and elevation to the sensed azimuth and elevation of the target. This map point is deemed to be the location of the target. Block 248 represents the reporting of the selected map point as being the location of the target. Logic 202 of FIG. 2b ends at an END block 250.

FIG. 5 is a cross sectional or elevation view of the terrain of FIG. 1a that helps to illustrate why the selection of the closest cell with the highest elevation in the logic flow operates to identify the location of the target object. In FIG. 5, Cell R0 has a maximum elevation angle of −80 degrees, cell R1 has a maximum elevation angle of −60 degrees, cell R2 has a maximum elevation angle of −40 degrees, cell R3 has a maximum elevation angle of −15 degrees, cell R4 has a maximum elevation angle of −5 degrees, cell R5 has a maximum elevation angle of −7 degrees, cell R6 has a maximum elevation angle of −20 degrees, cell R7 has a maximum elevation angle of −3 degrees, cell R8 has a maximum elevation angle of +1 degree, cell R9 has a maximum elevation angle of +5 degrees, and cell R10 has a maximum elevation angle of +8 degrees. As illustrated in the example of FIG. 5, the target object 40 lies below the maximum elevation in range cell R4. The camera 12 detects the object as being at a depression angle of −8°. Therefore, cells R4, R5, R7, R8, R9, and R10 have maximum cell elevation angles that are greater or higher. Block 244 of the logic of FIGS. 2a and 2b selects the cell which is closest to the camera, in this case cell R4, as the one in which the target is located, as this is the one that the vector from the camera at the elevation angle of −8 degrees first intersects. Cells behind (more remote from camera 12 than) cell R4 are either obstructed or merely have maximum elevation angles above the elevation angle at which the target is located. In this case, cells R5 and R7 are obstructed from the camera's view, and cells R8, R9, and R10 have elevation angles greater than that at which the target lies. Cell R7 has elevation angles which are the same as those of the target, but it is more remote from the camera than cell R5, so is not selected.

Processor 28 of FIGS. 1a, 1b, 1d, and 1e, and correlator 50 of FIG. 1c produce object latitude, longitude, and altitude, which are coupled by way of path 30 or 330 to one or more utilization devices. In FIG. 1a, the utilization device(s) may include a controller 60 for a controllable field-of-view camera 62, which is preferably a pan, tilt, zoom, (PTZ) and speed controllable camera, which can be directed toward the location of the target to provide a zoomed view. The utilization device(s) of FIG. 1a may include map display device 63, and/or an anti-incursion weapon or close surveillance device represented as a block 65.

The PTZ interrogation camera 61 and anti-incursion or close surveillance device 65 operate in mutually similar manners, in that a processor or operator selects an object of interest, and upon selection the 3D coordinates would be communicated to the system. A PTZ interrogation camera and a system connected to it uses the stream of object positions to focus and optionally follow the target, thereby allowing the operator to more effectively identify the object, such as what the person may be wearing or carrying or counting the number of individuals in a group of people traveling closely together. This type of use supports operations in determining the correct response to send for the incursion as number of responders and equipment.

The camera control block 60 in the case of the system of FIG. 1b controls the camera 12 rather than a separate camera. This admits of the possibility that, during a zooming function of camera 12 that reduces the field of view to less than the entire region of interest, intrusion might occur in the region not being monitored. This could be a temporary action to closely monitor the target before resuming wide area surveillance.

According to a further aspect of the invention, information from a separate two-dimensional radar system (a radar that provides range and azimuth) can be used to cue the camera. FIG. 1f is similar to FIG. 1d, but illustrates separate processors 601 and 602. Processor 602 receives base terrain map information from block 18 and generates a further computed terrain map 603 for the vicinity of the radar 8. This is the same process used in Processor 16. If the radar 8 and the camera 12 happen to be collocated, the same computed terrain map can be used for both. In operation, processor 601 uses the measured range and azimuth from the radar together with the computed terrain map to determine the target's 3-D location. The target's 3-D location is, in turn, used to cue the camera. This is advantageous because the radar can cover a larger field of view than the camera, but has insufficient resolution to identify the target. FIG. 2c illustrates the processing 203 in Processor 601 to generate a 3-D target location from a 2-D radar track. The logic of FIG. 2c continues from the logic 201 of FIG. 2a. Block 260 of logic 203 represents the reading of the target range and azimuth information provided by the radar. Block 262 represents the determination of the set of range/azimuth cells in which the radar range is found. The cross-range of the target is determined in block 264 as described in conjunction with FIG. 4. Block 266 represents the selection of that map point which is closest to the range and azimuth of the target. The map point is reported (block 268) and the logic ends (270).

Figure 1G:
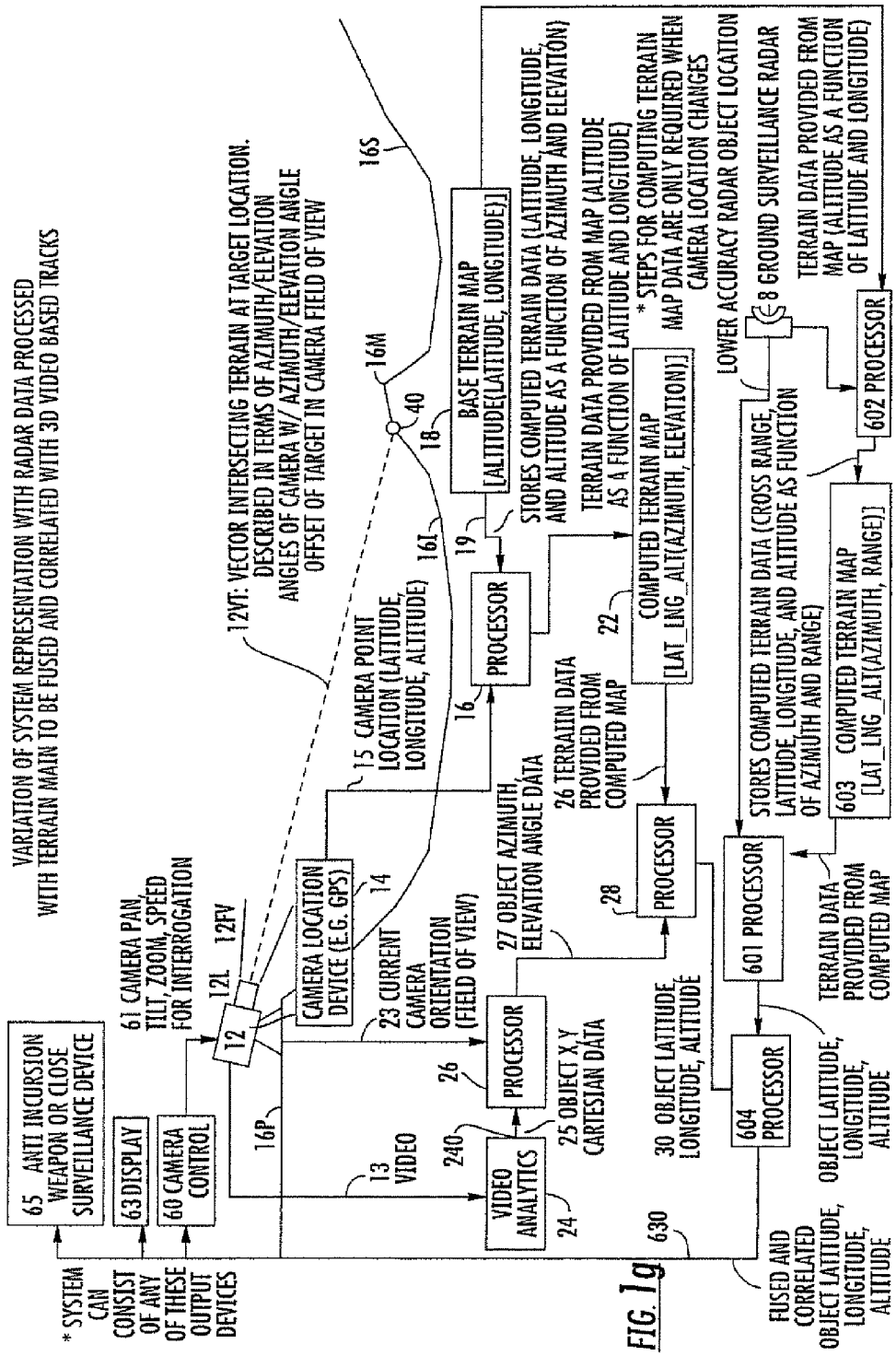
FIG. 1g is similar to FIG. 1b, but includes radar processors, an additional computed terrain map, and a further processor which correlates and fuses the information from the radar and from the camera.

According to another aspect of the invention, the radar data can be fused with the camera data to more accurately locate the target, as the radar provides better range resolution than the camera with its processing. FIG. 1g is similar to FIG. 1b, but includes a radar 8, radar processors 601 and 602, computed terrain map 603, and a further processor 604 which correlates and fuses the target location information from the radar and the camera. The fused information can be used for display, or to actuate or command an anti-incursion weapon or close surveillance device.

While three distinct range sets are illustrated in FIG. 3 and eleven in FIG. 4, any number of range increments can be used, and any number of azimuth sectors in each range increment, meaning that the azimuth sector angle increments can be greater or less than the 2°, 5°, and 45° described in the example.

A method according to an aspect of the invention is for determining the location of a moving object (40) in a region of interest (9). The method comprises the steps of observing the region of interest (9) with a camera (12) to produce a frame-sequential video signal representing at least a part of the region of interest (9). Geospatial coordinates of the location of the camera (12), and information relating to the azimuth angle, elevation angle, and field of view of the camera (12) are provided (14). The video signal is applied to video analytics (24) processing for detecting an object(s) (40) which move(s) from frame to frame of the video signal, and for identifying the location in a two-dimensional Cartesian coordinate system of an object (40) which moves from frame to frame of the video signal. The location in a two-dimensional Cartesian coordinate system of an object (40) which moves from frame to frame of the video signal is converted to a location in expressed in terms of azimuth and elevation angle. A computed map (22) is provided that includes the altitudes of geospatial coordinate points, at least in the region of interest (9), together with computed range, azimuth, and elevation from the camera (12) location to each computed map (22) point. The computed map (22) information is processed (28) together with the location of the object (40) expressed in terms of azimuth and elevation angle and together with the location of the camera (12) and information relating to the azimuth angle, elevation angle, and field of view of the camera (12), for producing information (path 30) relating to the location of the moving object (40) in three dimensions. The information may be in the form of longitude, latitude, and altitude. The three-dimensional location of the moving object can be displayed, or a zoom camera may be directed toward the location for better identification, or a weapon or surveillance device may be directed toward the location.

In a particular mode of this method, the step of providing a computed map (22) including the altitudes of geospatial coordinate points, at least in the region of interest (9), together with computed range, azimuth, and elevation from the camera (12) location to each computed map (22) point, comprises the step of providing a terrain map (18) including the altitudes of geospatial coordinate points, at least in the regions of interest. These geospatial coordinate points may be expressed in terms of longitude and latitude. The terrain map (18) information is processed (16) together with the location of the camera (12) and information relating to the azimuth angle, elevation angle, and field of view of the camera (12), to produce a computed map (18) including latitude, longitude and altitude as a function of azimuth and elevation.

According to a further aspect of the invention, the step of processing the terrain map (18) together with the location of the object (40) in azimuth and elevation angle together with the location of the camera (12) and information relating to the azimuth angle, elevation angle, and field of view of the camera (12), for producing information relating to the location in three dimensions of the moving object (40), includes the step (FIG. 3) of identifying a plurality of contiguous or juxtaposed azimuth-range cells covering the terrain point (7)s available from the terrain map (18), so that plural terrain point (7)s lie in each range cell. The range, azimuth and elevation relative to the camera (12) location are calculated for each terrain point (7). The azimuth-range cell in which the target is located is determined. That terrain point (7) within that one of the azimuth-range cells which is closest to the target is identified. That terrain point (7) within that one of the azimuth-range cells which is closest to the target is deemed to be the location of the target.

What is claimed is:

1. A method for determining the location of a moving object in a region of interest, said method comprising the steps of:
    observing said region of interest with a camera to produce a frame-sequential video signal representing at least a part of said region of interest;
    providing geospatial coordinates of the location of said camera and information relating to an azimuth angle, elevation angle, and field of view of said camera;
    applying said video signal to video analytics processing for detecting objects which move from frame to frame of said video signal and for identifying a location in a two-dimensional Cartesian coordinate system of an object which moves from frame to frame of said video signal;
    converting said location of said object to a location in azimuth and elevation angle;
    providing a map including altitudes of geospatial coordinate points, at least in the region of interest, together with computed range, azimuth, and elevation from the camera location to each map point;
    processing said map together with said location of said object in azimuth and elevation angle together with said location of said camera and information relating to the azimuth angle, elevation angle, and field of view of said camera, for producing information relating to a location in three dimensions of said moving object; and
    displaying the three-dimensional location of said moving object.

2. A method according to claim 1, wherein said step of providing a map including the altitudes of geospatial coordinate points, at least in the region of interest, together with computed range, azimuth, and elevation from the camera location to each map point, comprises the steps of:
    providing a terrain map including altitudes of geospatial coordinate points, at least in the regions of interest;
    processing said terrain map together with said location of said camera and information relating to the azimuth angle, elevation angle, and field of view of said camera, to produce a computed map including latitude, longitude and altitude as a function of azimuth and elevation.

3. A method according to claim 1, wherein said step of processing said map together with said location of said object in azimuth and elevation angle together with said location of said camera and information relating to the azimuth angle, elevation angle, and field of view of said camera, for producing information relating to the location in three dimensions of said moving object, includes the steps of:
- identifying a plurality of contiguous or juxtaposed azimuth-range cells covering terrain points available from said map, so that plural terrain points lie in each azimuth-range cell;
- for each terrain point, calculating range, azimuth and elevation relative to the camera location;
- locating the one of said azimuth-range cells in which the target is located;
- identifying the terrain point within that one of said azimuth-range cells which is closest to said target; and
- deeming said terrain point within that one of said azimuth-range cells which is closest to said target to be the location of said target.

4. A method for performing close surveillance of a moving object in a region of interest, said method comprising the steps of:
- observing said region of interest with a camera to produce a frame-sequential video signal representing at least a part of said region of interest;
- providing geospatial coordinates of a location of said camera and information relating to the azimuth angle, elevation angle, and field of view of said camera;
- applying said video signal to video analytics processing for detecting objects which move from frame to frame of said video signal and for identifying a location in a two-dimensional Cartesian coordinate system of an object which moves from frame to frame of said video signal;
- converting said location of said object to a location in azimuth and elevation angle;
- providing a map including altitudes of geospatial coordinate points, at least in the region of interest, together with computed range, azimuth, and elevation from the camera location to each map point;
- processing said map together with said location of said object in azimuth and elevation angle together with said location of said camera and information relating to the azimuth angle, elevation angle, and field of view of said camera, for producing information relating to, a location in three dimensions of said moving object; and
- guiding one of a surveillance craft and a surveillance device to said three-dimensional location of said moving object.

5. A method for attacking a moving object in a region of interest, said method comprising the steps of:
- observing said region of interest with a camera to produce a frame-sequential video signal representing at least a part of said region of interest;
- providing geospatial coordinates of a location of said camera and information relating to azimuth angle, elevation angle, and field of view of said camera;
- applying said video signal to video analytics processing for detecting objects which move from frame to frame of said video signal and for identifying a location in a two-dimensional Cartesian coordinate system of an object which moves from frame to frame of said video signal;
- converting said location of said object to a location in azimuth and elevation angle;
- providing a map including altitudes of geospatial coordinate points, at least in the region of interest, together with computed range, azimuth, and elevation from the camera location to each map point;
- processing said map together with said location of said object in azimuth and elevation angle together with said location of said camera and information relating to the azimuth angle, elevation angle, and field of view of said camera, for producing information relating to a location in three dimensions of said moving object; and
- directing a weapon toward said three-dimensional location for disabling said moving object.

6. A method according to claim 1, for performing close surveillance of a moving object in a region of interest, said method comprising the steps of:
- additionally observing said region of interest with radar to produce a two-dimensional radar track including at least range and azimuth of an object in the region of interest;
- providing geospatial coordinates of a location of said radar;
- providing a further map including altitudes of geospatial coordinate points, at least in the region of interest, together with computed range, azimuth, and elevation from the radar location to each map point;
- processing said further map together with said location of said radar track in range and azimuth angle together with said location of said radar for producing three dimensional radar object location information; and
- cueing a camera with said three dimensional radar object location information to observe said three dimension object location to further identify the object.

7. A method according to claim 1, for performing close surveillance of a moving object in a region of interest, said method comprising the steps of:
- additionally observing said region of interest with radar to produce a two-dimensional radar track, including at least range and azimuth, of an object in the region of interest;
- providing geospatial coordinates of a location of said radar;
- providing a further map including altitudes of geospatial coordinate points, at least in the region of interest, together with computed range, azimuth, and elevation from the radar location to each map point;
- processing said further map together with said location of said radar track in range and azimuth angle together with said location of said radar for producing three dimensional radar object location information;
- correlating the processed three dimensional radar object location information to the processed three dimensional object location obtained from said information from said camera;
- fusing the information from the two object locations to improve an accuracy of the three-dimensional object location; and
- guiding a surveillance craft to said three-dimensional object location.

8. A system for determining the location of a moving object in a region of interest, said system comprising:
- a camera, and
- a processor associated with the camera, the processor executing instructions for performing the steps of:
- observing said region of interest with the camera to produce a frame-sequential video signal representing at least a part of said region of interest;
- providing geospatial coordinates of the location of said camera and information relating to an azimuth angle, elevation angle, and field of view of said camera;
- applying said video signal to video analytics processing for detecting objects which move from frame to frame of said video signal and for identifying a location in a two-dimensional Cartesian coordinate system of an object which moves from frame to frame of said video signal;

converting said location of said object to a location in azimuth and elevation angle;

providing a map including altitudes of geospatial coordinate points, at least in the region of interest, together with computed range, azimuth, and elevation from the camera location to each map point;

processing said map together with said location of said object in azimuth and elevation angle together with said location of said camera and information relating to the azimuth' angle, elevation angle, and field of view of said camera, for producing information relating to a location in three dimensions of said moving object; and displaying the three-dimensional location of said moving object.

9. A system according to claim 8, wherein said step of providing a map including the altitudes of geospatial coordinate points, at least in the region of interest, together with computed range, azimuth, and elevation from the camera location to each map point, comprises the steps of:

providing a terrain map including altitudes of geospatial coordinate points, at least in the regions of interest;

processing said terrain map together with said location of said camera and information relating to the azimuth angle, elevation angle, and field of view of said camera, to produce a computed map including latitude, longitude and altitude as a function of azimuth and elevation.

10. A system according to claim 8, wherein said step of processing said map together with said location of said object in azimuth and elevation angle together with said location of said camera and information relating to the azimuth angle, elevation angle, and field of view of said camera, for producing information relating, to the location in three dimensions of said moving object, includes the steps of:

identifying a plurality of contiguous or juxtaposed azimuth-range cells covering terrain points available from said map, so that plural terrain points lie in each azimuth-range cell;

for each terrain point, calculating range, azimuth and elevation relative to the camera location;

locating the one of said azimuth-range cells in which the target is located;

identifying the terrain point within that one of said azimuth-range cells which is closest to said target; and deeming said terrain point within that one of said azimuth-range cells which is closest to said target to be the location of said target.

11. A system according to claim 8, wherein the processor executes instructions for performing the further steps of:

additionally observing said region of interest with radar to produce a two-dimensional radar track including at least range and azimuth of an object in the region of interest;

providing geospatial coordinates of a location of said radar;

providing a further map including altitudes of geospatial coordinate points, at least in the region of interest, together with computed range, azimuth, and elevation from the radar location to each map point;

processing said further map together with said location of said radar track in range and azimuth angle together with said location of said radar for producing three dimensional radar object location information; and cueing a camera with said three dimensional radar object location information to observe said three dimension object location to further identify the object.

12. A system according to claim 8, wherein the processor executes instructions for performing the further steps of:

additionally observing said region of interest with radar to produce a two-dimensional radar track, including at least range and azimuth, of an object in the region of interest;

providing geospatial coordinates of a location of said radar;

providing a further map including altitudes of geospatial coordinate points, at least in the region of interest, together with computed range, azimuth, and elevation from the radar location to each map point;

processing said further map together with said location of said radar track in range and azimuth angle together with said location of said radar for producing three dimensional radar object location information;

correlating the processed three dimensional radar object location information to the processed three dimensional object location obtained from said information from said camera;

fusing the information from the two object locations to improve an accuracy of the three-dimensional object location; and guiding a surveillance craft to said three-dimensional object location.

13. A system according to claim 8, wherein the camera is a controllable field of view camera.

14. A system according to claim 8, further comprising a global positioning system associated with the camera.

15. A system according to claim 8, further comprising a camera controller associated with the camera, the camera controller configured for controlling at least one of pan, tilt, zoom, speed, and field-of-view of the camera.

16. A system according to claim 8, further comprising a source of radar data associated with the processor.

17. A system according to claim 8, further comprising a source of ground sensor data associated with the processor.

18. A system according to claim 8, further comprising a display device associated with the camera for displaying the three-dimensional location of said moving object.

19. A system according to claim 8, further comprising an anti-incursion weapon or close surveillance device associated with the processor.

20. A system according to claim 8, further comprising a video analytics system for performing a pixel-to-pixel comparison of video from the camera to identify motion from frame to frame in any pixel-to-pixel changes.

* * * * *